United States Patent
Friend et al.

(10) Patent No.: US 8,456,068 B2
(45) Date of Patent: Jun. 4, 2013

(54) PIEZOELECTRIC ACTUATOR FOR USE IN MICRO ENGINEERING APPLICATIONS

(75) Inventors: James Robert Friend, Oakleigh East (AU); Leslie Yu-Ming Yeo, Malvern (AU); Brett Watson, Brunswick (AU)

(73) Assignee: Royal Melbourne Institute of Technology, Melbourne, Victoria (AU)

( * ) Notice: Subject to any disclaimer, the term of this patent is extended or adjusted under 35 U.S.C. 154(b) by 379 days.

(21) Appl. No.: 12/644,958

(22) Filed: Dec. 22, 2009

(65) Prior Publication Data

US 2011/0148253 A1    Jun. 23, 2011

(51) Int. Cl.
*H01L 41/08*    (2006.01)

(52) U.S. Cl.
USPC ........................ 310/367; 310/323.01

(58) Field of Classification Search
USPC ................. 310/323, 328, 339, 367
See application file for complete search history.

(56) References Cited

U.S. PATENT DOCUMENTS

| | | | | |
|---|---|---|---|---|
| 3,963,966 A | * | 6/1976 | Mohr | 361/260 |
| 4,947,076 A | * | 8/1990 | Kumada | 310/323.02 |
| 5,410,204 A | * | 4/1995 | Imabayashi et al. | 310/323.13 |
| 6,366,004 B1 | * | 4/2002 | Yano et al. | 310/323.12 |
| 6,404,104 B1 | * | 6/2002 | Maeno et al. | 310/323.02 |
| 6,952,072 B2 | * | 10/2005 | Iino et al. | 310/323.04 |
| 7,312,557 B2 | * | 12/2007 | Rastegar et al. | 310/339 |
| 8,084,921 B2 | * | 12/2011 | Kasai et al. | 310/323.14 |
| 8,183,746 B2 | * | 5/2012 | Rastegar | 310/339 |
| 2006/0255690 A1 | * | 11/2006 | Rastegar et al. | 310/339 |
| 2007/0200456 A1 | * | 8/2007 | Lazzarin | 310/323.02 |
| 2010/0199982 A1 | * | 8/2010 | Hansen | 128/200.21 |
| 2011/0204751 A1 | * | 8/2011 | Rastegar et al. | 310/339 |

OTHER PUBLICATIONS

Satonobu et al., "Improvement of the Longitudinal Vibration System for the Hybrid Transducer Ultrasonic Motor," IEEE Transactions on Ultrasonics, Ferroelectrics, and Frequency Control, Jan. 2000, vol. 47, Issue 1, pp. 216-221.

* cited by examiner

*Primary Examiner* — J. San Martin
(74) *Attorney, Agent, or Firm* — Woodcock Washburn LLP

(57) ABSTRACT

A piezoelectric actuator including a piezoelectric element and an elongate transducer mounted on the piezoelectric element. The transducer is formed from an elongate cylindrical member, and at least one helical slot is provided around the outer surface of the cylindrical member to enable coupling of resonance modes of the transducer when actuated by the piezoelectric element.

10 Claims, 2 Drawing Sheets

PIEZOELECTRIC ACTUATOR FOR USE IN MICRO ENGINEERING APPLICATIONS

FIELD OF THE INVENTION

The present invention is directed to a piezoelectric actuator for use in micro engineering applications. The invention will be described in its application within a micro motor. It is however to be appreciated that the present invention is not limited to this application, and that other applications of the invention are also envisaged.

BACKGROUND TO THE INVENTION

The conventional electromagnetic motor has been widely used for a large variety of applications since its development some 120 years ago. The manner of operation of such electromagnetic motors however prevents its use in the field of micro electromechanical systems. This is because such motors operate by way of an interaction between permanent magnets and a magnetic field induced by a coil. As the size of the motor is reduced, the magnetic force reduces proportional to the length scale of the motor to the power of four. Furthermore, the rotation speed increases in proportion to the motor diameter to the power of two with motors of 1 mm in diameter typically having rotation speed in excess of 25,000 rpm. Therefore it is practically not possible to use electromagnetic motors for designs having a volume less than 1 cm$^3$.

By comparison, ultrasonic motors have the benefit of being able to maintain relatively large output torques at such small dimensions. In order for a piezoelectric transducer to function as a motor, it is preferable to induce both a torsional as well as an axial mode within an elongate transducer element. Various piezoelectric motor designs have been developed to achieve such actuation of an elongate transducer element. We refer for example to the paper titled "Improvement of the Longitudinal Vibration System for the Hybrid Transducer Ultrasonic Motor" by Jun Satonobu et al (IEEE Transactions on Ultrasonics, Ferroelectrics, and Frequency Control, Vol. 47, No. 1, January 2000), there is described an ultrasonic motor which uses a series of piezoelectric annular discs interposed between annular discs of frictional material, and together surrounding an elongate drive shaft. This arrangement allows for both axial as well as torsional vibration to be induced in the drive shaft. This ultrasonic motor is however relatively complex in design and expensive to make and cannot be used at sizes less than 10 mm in length.

It has been found that it is possible to induce both an axial and torsional vibration in an elongate transducer if an asymmetric inhomogeneity is introduced along that transducer. For example, the transducer may be produced by twisting a flat plate or square or bars of other non-circular cross-sections to produce a relatively uniform spiral arrangement along the length of the transducer. A problem with the use of such twisted transducers is that it is difficult to adequately control the twisting of the transducer during fabrication to provide the necessary twisted configuration. Therefore, the practical difficulties in producing such a configuration limits its application, particularly in micro electromechanical systems.

SUMMARY OF THE INVENTION

It is therefore an object of the present invention to provide a piezoelectric actuator that is relatively inexpensive to manufacture and can also be used in micro engineering applications.

With this in mind, the present invention provides in one aspect a piezoelectric actuator including a piezoelectric element;

an elongate transducer mounted on the piezoelectric element;

the transducer being formed from an elongate cylindrical member, wherein at least one helical slot is provided around the outer surface of the cylindrical member to enable coupling of resonance modes of the transducer when actuated by the piezoelectric element.

According to another aspect of the invention, there is provided a micro motor including a piezoelectric actuator as described above.

According to one preferred embodiment of the present invention, the transducer is in the form of a hollow tube. The transducer may include a single continuous helical slot extending at least substantially along the length of the transducer on its outer surface. The helical slot may have a pitch angle which varies along the length of the transducer.

A series of discontinuous helical slots may also, or alternatively, be provided along the length of the transducer. As shown in FIG. 3, the slots may be concentrated more along one side of the transducer to thereby further effect a flexural resonance mode of the transducer.

The use of a helical cut transducer enables the coupling of the axial, torsional, and/or flexural resonance modes of that transducer when actuated by the piezoelectric element. Furthermore, this arrangement allows for the motor to be operated at the resonance frequency of the transducer.

We note that the motor should preferably operate at or near the resonance frequency of the transducer to maximise the output displacement that can be provided by the deformation of the piezoelectronic element. At non-resonance frequencies the output displacement can be very low, typically with strains of less than 0.1%.

Useful axial and torsional vibration modes can be obtained from the piezoelectronic transducer according to the present invention by closely matching the resonance frequencies of each vibration type with the design of the transducer. In particular, variation in the width (FIG. 5) and pitch distribution (FIG. 4) of the helical slots along the length of the transducer can control the resonance frequencies of each vibration mode and the manner in which they are compiled.

Furthermore, varying the pitch of the helical cut along the length of the transducer allows for the torsional and axial resonance frequencies of the transducer to be matched. This acts to maximise the output vibration, and therefore the output performance of the motor.

The use of discontinuous helical slots, such that the slots are concentrated more along one side of the transducer, thereby forms a circumferential asymmetry which facilitates a flexural vibration mode in addition to the torsional and axial vibration modes.

The addition of the flexural vibration mode allows motion of the transducer relative to three axes namely the elongate axis of the transducer and the "x" and "y" axes which are respectively perpendicular to the elongate axis and perpendicular to each other.

The flexural vibration mode may be designed to be at or near the flexural resonance frequency of the transducer. Alternatively, by designing the flexural vibration mode to be slightly off-resonance, it allows the selection of differently designed motions by choosing its operating frequency.

Therefore, the following motions of a rotor actuated by the piezoelectronic transducer can be achieved as follows:

a) "x" axis flexural vibration together with "y" axis flexural vibration results in rotation of the rotor about the elongate axis of the transducer;

b) "x" axis flexural vibration together with axial vibration results in rotation of the rotor about the "y" axis;

c) "y" axis flexural vibration together with axial vibration results in rotation of the rotor about the "x" axis; and d) torsional vibration and axial vibration results in rotation of the rotor about the elongate axis of the transducer.

The tube used to produce the motor may be formed from stainless steel, and may have a diameter of around 250 microns. Such stainless steel tubes are used in the medical industry as the basis for micro stents, and is therefore widely available. The tube can be fabricated through the use of micro laser machining, a manufacturing process which is commercially available through companies such as Norman Noble, Inc, USA. The piezoelectric element can be readily obtained from commercial sources. For example, Lead Zirconate Titanate elements can be obtained from Fuji Ceramics Corporation, Japan. The piezoelectric actuator, and the ultrasonic resonance micro motor produced using that actuator can therefore be manufactured at relatively low cost, and can be fabricated for use in micro engineering applications.

BRIEF DESCRIPTION OF THE DRAWINGS

It will be convenient to further describe the invention with reference to the accompanying drawings which illustrate a preferred embodiment of the present invention. Other embodiments are possible, and consequently, the particularity of the accompanying drawings is not to be understood as superseding the generality of the preceding description of the invention.

In the drawings.

DETAILED DESCRIPTION OF THE INVENTION

Known small scale piezoelectric ultrasonic resonant motors have many shortcomings preventing the manufacture of a rotational motor with a volume of significantly less than 1 $mm^3$. One major shortcoming is the fragility of the motor due to the stator of the motor being fabricated from a piezoelectric ceramic, which further leads to high motor complexity because of the requirement for multiple electrical input signals and associated difficulties in fabrication of the motor. The ultrasonic motor according to the present invention, by comparison, uses an electromagnetic element which is not integral to the stator of the motor.

Figure 1:
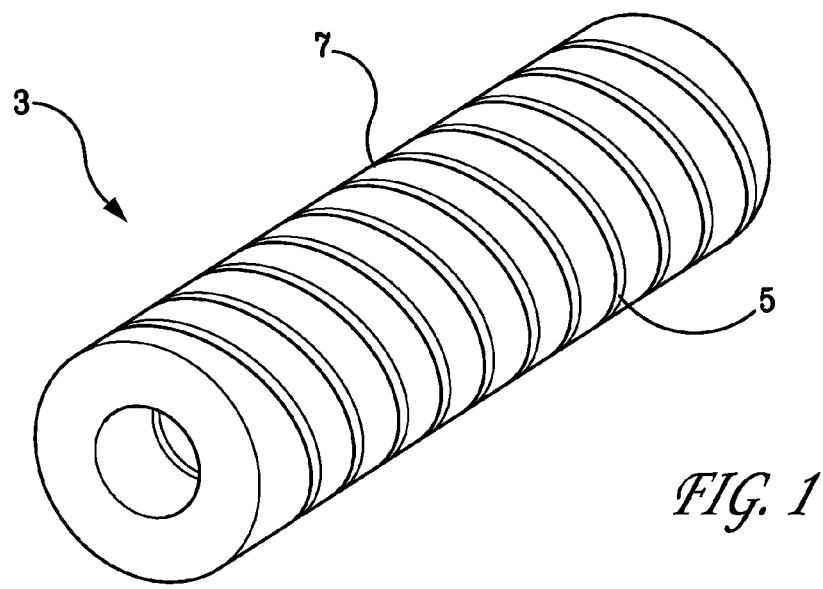
FIG. 1 is a perspective view showing the piezoelectric transducer according to the present invention.
Figure 2:
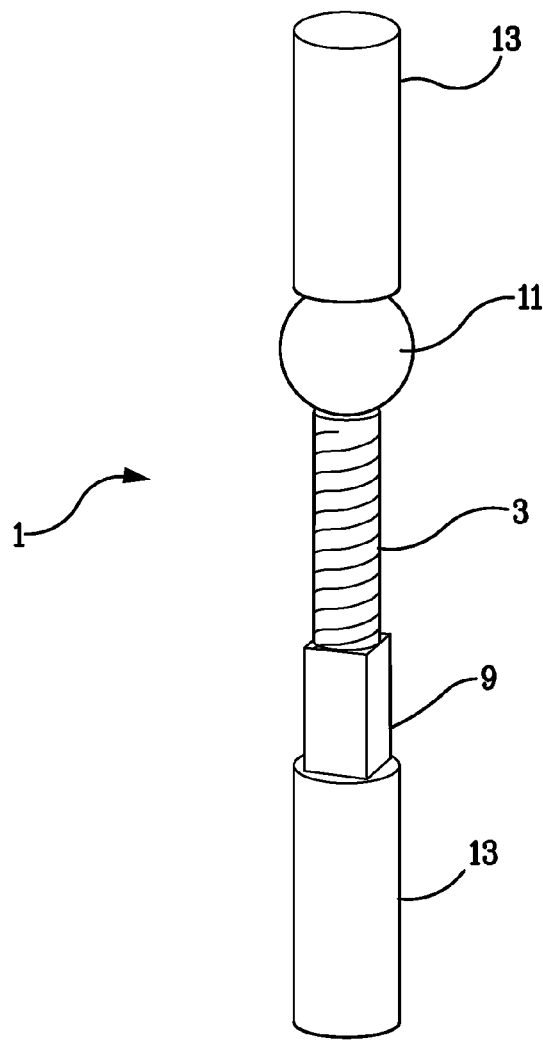
FIG. 2 is a perspective view of an ultrasonic micro-motor set up according to the present invention.
Figure 3:
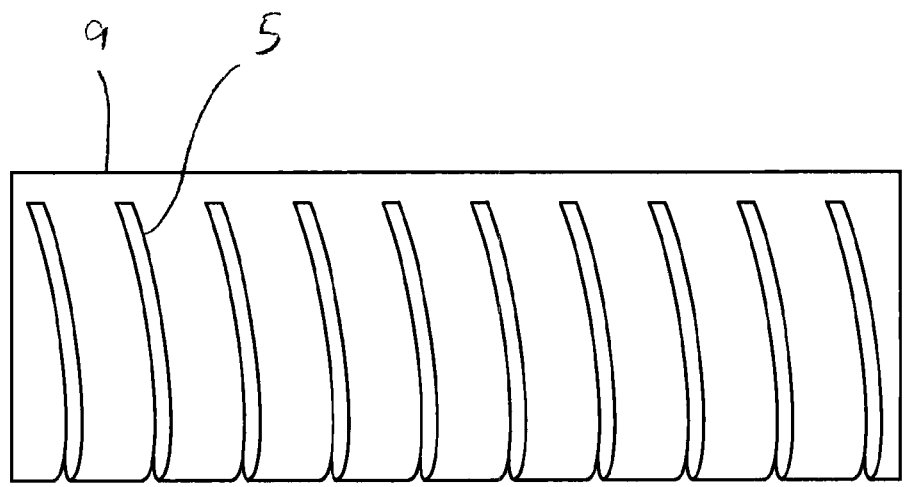
FIG. 3 shows the helical slot being discontinuous, i.e. there is a break in the slot on one side of the cylindrical transducer.
Figure 4:
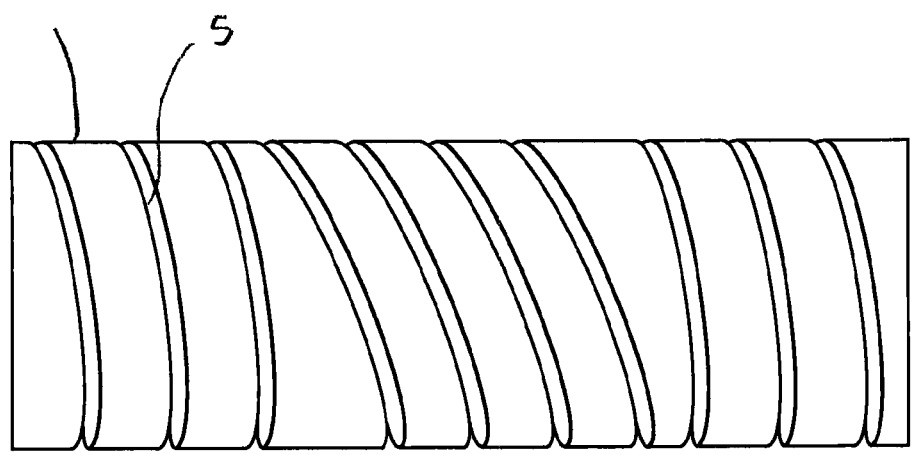
FIG. 4 shows a helical slot where the pitch angle of the slot varies along the length of the transducer, i.e. the pitch angle is greater in the middle of the transducer.
Figure 5:
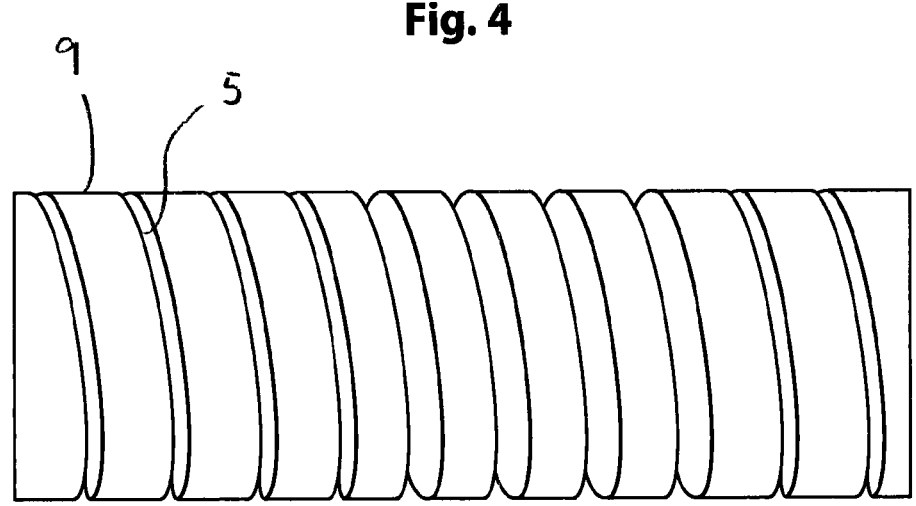
FIG. 5 shows a helical slot that varies in width along the length of the transducer, i.e. the slot is wider in the middle of the transducer.

Referring to FIGS. 1 and 2, the micro-motor according to the present invention may include a piezoelectric actuator 1 including a piezoelectric element 9. An elongate transducer 3 may be mounted on the piezoelectric element 9, this transducer 3 providing the "stator" for the micro-motor. This stator 3 may be fabricated from a 304 stainless steel tube, with helical cuts 5 along the external surface 7 of the stator 3. The helical cuts were fabricated by laser micromachining solutions at Macquarie University in New South Wales, Australia.

The geometry of the stator 3, as shown in FIG. 1 and as detailed in the following table was chosen to closely match the axial and torsional resonant frequencies of the stator while ensuring the overall volume remained less than 0.25 $mm^3$.

| Object | Dimension (μm) |
|---|---|
| Base Tube | |
| Inside Diameter | 200 |
| Outside Diameter | 241 |
| Length | 985 |
| Helical Cut | |
| Width | 28 |
| Pitch | 440 |
| Length | 880 |

FIG. 2 shows the micro-motor set up used to investigate the performance of the micro-motor. According to this set up, the stator 3 is mounted to the piezoelectric element 9. At the free end of the stator 3 is located a stainless steel ball 11 having a diameter of 0.5 mm, with opposing magnets 13 having a diameter of 0.4 mm respectively located against the piezoelectric element 9 and the stainless steel ball 11 apply a magnetic free load to the ultrasonic micro-motor set up. This magnetic free load was measured to be 53 μN. The resonance modes were excited by a 0.25 mm×0.25 mm×0.5 mm lead zirconate titanate (PZT) element 9 (C203, Fuji Ceramics, Tokyo, Japan). The motor was able to demonstrate bi-directional operation with clockwise rotation at the third harmonic, 732 kHz and counterclockwise rotation at the second harmonic, 526 kHz. Using known motor performance determination efforts, a maximum clockwise angular velocity of 830 rad/s (7,925 rpm) was recorded at an input of 20 Vp-p and 732 kHz. The average clockwise start-up torque was found to be 47 nNm with a peak of 51 nNm and a minimum of 39.8 nNm. The average braking torque was calculated to be 17.8 nNm. A maximum counterclockwise angular velocity of 1600 rad/s (15,280 rpm) at 32.1 Vp-p and 526 kHz was recorded.

The novel stator design according to the present invention which couples actual and torsional resonance modes simplifies current piezoelectric ultrasonic resonance designs and results in a motor volume of less than 1 $mm^3$. The ultrasonic motor has a peak torque of 51 nNm and a maximum rotational velocity in excess of 15,000 rpm. This motor performance has been theoretically shown to be significant enough to propel a swimming microbot in a human body.

Modifications and variations as would be deemed obvious to the person skilled in the art are included within the ambit of the present invention as claimed in the appended claims.

The invention claimed is:

1. A micro-motor comprising a piezoelectric actuator including a piezoelectric element that generates motion from electricity applied thereto, an elongate transducer mounted on the piezoelectric element, and a rotor supported on a free end of the elongate transducer, the transducer being formed from an elongate hollow tube, wherein at least one helical slot is provided around the outer surface of the transducer to enable coupling of resonance modes of the transducer when actuated by motion of the piezoelectric element to thereby generate rotational motion at the free end of the transducer and in the rotor mounted thereon.

2. A micro-motor according to claim 1 wherein a single continuous helical slot extends along the length of the transducer.

3. A micro-motor according to claim 1 wherein discontinuous helical slots extend along the length of the transducer.

4. A micro-motor according to claim 1, including varying the pitch angle of the helical slots along the length of the transducer.

5. A micro-motor according to claim 1, including varying the width of the helical slots along the length of the transducer.

6. A piezoelectric actuator micro-motor according to claim 1, wherein the tube is made from a stainless steel micro-stent.

7. A micro-motor according to claim 1, wherein the piezoelectric element is formed from Lead Zinconate Titanate.

8. A micro-motor according to claim 1, wherein the at least one helical slot extends through a wall of the transducer.

9. A micro-motor according to claim 1, the rotor being in the form of a ball.

10. A micro-motor according to claim 9, wherein the rotor is a stainless steel ball.

* * * * *